(12) United States Patent
Lin et al.

(10) Patent No.: US 11,797,058 B2
(45) Date of Patent: Oct. 24, 2023

(54) INTERMITTENT LIFTING ASSEMBLY AND MOBILE TERMINAL

(71) Applicant: HUAWEI TECHNOLOGIES CO., LTD., Shenzhen (CN)

(72) Inventors: Yangming Lin, Dongguan (CN); Hehui Yang, Dongguan (CN); Tao Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 17/482,911

(22) Filed: Sep. 23, 2021

(65) Prior Publication Data

US 2022/0011812 A1 Jan. 13, 2022

Related U.S. Application Data

(63) Continuation of application No. PCT/CN2019/127196, filed on Dec. 20, 2019.

(30) Foreign Application Priority Data

Mar. 27, 2019 (CN) .......................... 201910239678.8

(51) Int. Cl.
*G06F 1/16* (2006.01)
*G06F 1/20* (2006.01)

(52) U.S. Cl.
CPC .............. *G06F 1/166* (2013.01); *G06F 1/203* (2013.01); *G06F 1/1616* (2013.01)

(58) Field of Classification Search
CPC . E05D 11/10; E05D 11/1007; E05D 11/1014; E05D 11/1021; E05D 11/1028;
(Continued)

(56) References Cited

U.S. PATENT DOCUMENTS 5,987,704 A * 11/1999 Tang ..................... G06F 1/1616
16/342
7,414,834 B2 * 8/2008 Ukonaho .............. G06F 1/1681
361/679.55

(Continued)

FOREIGN PATENT DOCUMENTS

CN 101571731 A 11/2009
CN 201600613 U 10/2010
(Continued)

*Primary Examiner* — Michael A Matey
(74) *Attorney, Agent, or Firm* — Maier & Maier, PLLC

(57) ABSTRACT

An intermittent lifting assembly, configured to drive a heat dissipation panel of the mobile terminal to open and close. The intermittent lifting assembly includes: a first driving piece that includes a first intermittent gear and a convex shoulder disposed on the first intermittent gear; a second driving piece that includes a second intermittent gear engaged with the first intermittent gear, where a position-limiting slot is disposed on the second intermittent gear, the position-limiting slot is configured to limit a position in which the convex shoulder rolls when teeth of the first intermittent gear and teeth of the second intermittent gear are out of an engaged state; and a gap for avoiding the second intermittent gear is disposed on the convex shoulder; and further includes a swing rod that is fastened to the second intermittent gear and configured to drive the heat dissipation panel to open or close.

20 Claims, 11 Drawing Sheets

(58) Field of Classification Search
CPC ..... E05D 3/122; E05D 11/00; E05Y 2201/60; E05Y 2201/62; E05Y 2201/622; G06F 1/1681; G06F 1/1616; G06F 1/203; G06F 1/166; G06F 1/1637; G06F 1/16; H04M 1/022; Y10T 74/1888; Y10T 74/20654; Y10T 74/20636; F16H 19/08; H05K 7/02
See application file for complete search history.

(56) References Cited

U.S. PATENT DOCUMENTS

| | | | | |
|---|---|---|---|---|
| 8,104,144 B2 * | 1/2012 | Wang | ............... | G06F 1/1681 16/354 |
| 8,369,085 B2 * | 2/2013 | Hu | ............... | G06F 1/1681 361/679.55 |
| 8,474,101 B2 * | 7/2013 | Wang | ............... | G06F 1/1681 16/354 |
| 8,861,211 B2 * | 10/2014 | Yeh | ............... | F16H 19/08 361/755 |
| 8,976,524 B2 * | 3/2015 | Wang | ............... | G06F 1/1656 361/679.48 |
| 9,030,820 B2 | 5/2015 | Guo | | |
| 9,115,750 B2 * | 8/2015 | Park | ............... | F16C 11/10 |
| 9,127,490 B2 * | 9/2015 | Chen | ............... | E05D 3/122 |
| 9,617,770 B1 * | 4/2017 | Lin | ............... | E05D 11/082 |
| 9,625,952 B2 * | 4/2017 | Holung | ............... | E05D 3/122 |
| 9,740,253 B2 * | 8/2017 | Cheng | ............... | G06F 1/1681 |
| 9,759,242 B2 * | 9/2017 | Hsu | ............... | F16M 13/005 |
| 9,915,086 B2 * | 3/2018 | Kato | ............... | E05D 11/1078 |
| 9,927,845 B1 * | 3/2018 | Holung | ............... | H04M 1/022 |
| 10,174,535 B2 * | 1/2019 | Lin | ............... | G06F 1/1681 |
| 10,401,914 B2 * | 9/2019 | Shang | ............... | E05D 5/04 |
| 10,747,277 B2 * | 8/2020 | Ku | ............... | H05K 7/20145 |
| 10,852,775 B1 * | 12/2020 | Kim | ............... | E05D 3/02 |
| 10,908,653 B2 * | 2/2021 | Huang | ............... | E05D 11/00 |
| 2005/0287852 A1 | 12/2005 | Sugawara et al. | | |
| 2012/0147535 A1 * | 6/2012 | Ahn | ............... | G06F 1/1615 361/679.01 |
| 2012/0212924 A1 * | 8/2012 | Nakajima | ............... | G06F 1/1681 361/807 |
| 2013/0229763 A1 * | 9/2013 | Guo | ............... | G06F 1/203 361/679.27 |
| 2017/0192467 A1 * | 7/2017 | Holung | ............... | G06F 1/1654 |
| 2019/0186186 A1 * | 6/2019 | Tamer | ............... | E05D 11/06 |
| 2019/0317552 A1 * | 10/2019 | Cheng | ............... | G06F 1/1681 |

FOREIGN PATENT DOCUMENTS

| | | |
|---|---|---|
| CN | 202815686 U | 3/2013 |
| CN | 202815711 U | 3/2013 |
| CN | 203038162 U | 7/2013 |
| CN | 103294114 A | 9/2013 |
| CN | 203204532 U | 9/2013 |
| CN | 105257961 A | 1/2016 |
| CN | 205193676 U | 4/2016 |
| CN | 205193688 U | 4/2016 |
| CN | 106817877 A | 6/2017 |
| CN | 207319132 U | 5/2018 |
| CN | 207867392 U | 9/2018 |
| CN | 208224899 U | 12/2018 |
| TW | M537669 | 3/2017 |

* cited by examiner

INTERMITTENT LIFTING ASSEMBLY AND MOBILE TERMINAL

CROSS-REFERENCE TO RELATED APPLICATION

This application is a continuation of International Application No. PCT/CN2019/127196, filed on Dec. 20, 2019, which claims priority to Chinese Patent Application No. 201910239678.8, filed on Mar. 27, 2019. The disclosures of the aforementioned applications are hereby incorporated by reference in their entireties.

TECHNICAL FIELD

The embodiments relate to the field of mobile terminal technologies, and in particular, to an intermittent lifting assembly and a mobile terminal.

BACKGROUND

Increasing power consumption of notebook computers and improving performance of gaming computers impose higher requirements on heat dissipation. Heat generated by high power consumption cannot be dissipated, which is one of bottlenecks that restrict performance improvement of the notebook computers. In this case, heat dissipation performance becomes a key indicator of a notebook computer.

In a conventional method in the prior art, a heat from, for example, a CPU is first transferred to a heat dissipater, and then the heat is dissipated by using a fan. As power consumption increases, a rotational speed of a fan increases, and noise brought by the fan also increases. Consequently, user experience is poor. Generally, a notebook computer is provided with a comparatively small hole in the exterior of the notebook computer; an intake air volume is limited by an air intake vent, and a heat dissipation capability reaches a limit. This restricts performance improvement of the notebook computer. To further improve a heat dissipation effect, a heat dissipation panel is added to a housing of the notebook computer. The heat dissipation panel is rotatably connected to the housing. When heat dissipation needs to be performed, the heat dissipation panel is opened to increase an intake air volume, thereby enhancing a heat dissipation effect. However, in the prior art, a mechanism for driving the heat dissipation panel to open is comparatively complex, and occupies comparatively large space, affecting a size of the notebook computer.

SUMMARY

The embodiments provide an intermittent lifting assembly and a mobile terminal to reduce a size of a heat dissipation panel driving mechanism and reduce occupied space in the mobile terminal.

According to a first aspect, an intermittent lifting assembly is provided. The intermittent lifting assembly is configured to drive a heat dissipation panel of a mobile terminal to open and close, and includes three components: a first driving piece, a second driving piece, and a swing rod. The first driving piece is connected to a display screen of the mobile terminal, the first driving piece drives the second driving piece to rotate, the second driving piece is fastened to the swing rod, and the swing rod is slidably connected to the heat dissipation panel. The swing rod is rotated to drive the heat dissipation panel to rotate, to implement an effect of opening and closing. The first driving piece includes a first intermittent gear and a convex shoulder disposed on the first intermittent gear. The second driving piece includes a second intermittent gear, and the second intermittent gear is engaged with the first intermittent gear, to implement intermittent movement. In addition, a position-limiting slot is disposed on the second intermittent gear to lock the heat dissipation panel after the heat dissipation panel is opened. The position-limiting slot is configured to limit a position in which the convex shoulder rolls when teeth of the first intermittent gear and teeth of the second intermittent gear are out of an engaged state. In addition, a gap for avoiding the second intermittent gear is disposed on the convex shoulder. During disposing of the position-limiting slot, there may be one or two position-limiting slots. For example, two position-limiting slots disposed at intervals are disposed on the second intermittent gear, and the two position-limiting slots are both configured to limit a position in which the convex shoulder rolls before and after the teeth of the first intermittent gear and the teeth of the second intermittent gear are engaged. When the first driving piece fits with the second driving piece, the convex shoulder on the first intermittent gear rotates in one of the position-limiting slots. When the convex shoulder on the first intermittent gear rotates to a specific angle, the teeth of the first intermittent gear and the teeth of the second intermittent gear are engaged. The first intermittent gear continues to rotate to drive the second intermittent gear to rotate, and the second intermittent gear drives the swing rod to rotate to drive the heat dissipation panel to open. In addition, the convex shoulder rolls from the position-limiting slot in which the convex shoulder is located to the other position-limiting slot, and a gap for avoiding a spacing protrusion between the two position-limiting slots is disposed on the convex shoulder to cross over the spacing protrusion between the two position-limiting slots. In this way, when the teeth of the first intermittent gear and the teeth of the second intermittent gear are out of an engaged state, the convex shoulder can roll to the other position-limiting slot. When the convex shoulder is located in the other position-limiting slot, the convex shoulder may continue to rotate relative to the second intermittent gear. In this case, because the teeth of the first intermittent gear and the teeth of the second intermittent gear are out of the engaged state, the second intermittent gear is not driven to rotate. In addition, because the convex shoulder is located in the other position-limiting slot, the second intermittent gear may be locked, to avoid rotation of the second intermittent gear. In this case, the swing rod may be used to keep the heat dissipation panel open, so that a position of the heat dissipation panel is locked.

In a specific process of disposing the first intermittent gear and the second intermittent gear, the first intermittent gear includes N full-depth teeth, and the second intermittent gear includes (N-1) full-depth teeth and two non-full-depth teeth located on two sides of the (N-1) full-depth teeth, where N is a positive integer greater than 2. For example, the first intermittent gear is provided with two full-depth teeth, and the second intermittent gear is provided with one full-depth tooth and two non-full-depth teeth located on two sides of the full-depth tooth. A rotation angle of the second intermittent gear is determined based on a specified quantity of teeth of the first intermittent gear and a specified quantity of teeth of the second intermittent gear.

In a specific process of disposing the two position-limiting slots at intervals, the position-limiting slots are arc-shaped position-limiting slots, and the two position-limiting slots are located on two sides of the teeth of the second intermittent gear.

In a specific process of disposing the second intermittent gear, different manners may be used for the second intermittent gear. For example, the second intermittent gear includes a rotating shaft and a plurality of sheet metal tabs through which the rotating shaft penetrates, and each sheet metal tab is provided with teeth; when the plurality of sheet metal tabs are stacked and the rotating shaft penetrates through the sheet metal tabs, the plurality of sheet metal tabs form the second intermittent gear; and the swing rod is sleeved on the rotating shaft and is located at an end of the second intermittent gear, and the two position-limiting slots are disposed on the swing rod. That is, the plurality of sheet metal tabs form the second intermittent gear. During disposing, there may be two swing rods, and the two swing rods are respectively arranged on two sides of the second intermittent gear.

Additionally, the second intermittent gear may also be of another structure, for example, the swing rod and the second intermittent gear are of an integrated structure. There are two swing rods, and the two swing rods are respectively arranged on two sides of the second intermittent gear.

In a specific process of disposing the swing rod, a rolling wheel that is in sliding fit with the heat dissipation panel is disposed at an end, away from the second intermittent gear, of the swing rod. Friction resistance is reduced through sliding connection between the rolling wheel and the heat dissipation panel.

In a process of disposing the convex shoulder, an alignment protrusion is disposed on the convex shoulder, and an alignment groove fitted with the alignment protrusion is disposed on the second intermittent gear; and when the alignment protrusion fits with the alignment groove, the teeth of the first intermittent gear and the teeth of the second intermittent gear are aligned to an engaged state. An engagement effect between the first intermittent gear and the second intermittent gear is improved through fitting between the alignment protrusion and the alignment groove that are disposed.

In a specific implementable solution, the first driving piece further includes a first bracket fastened to the first intermittent gear, and the first bracket is configured to fixedly connect to a display screen of the mobile terminal. The first bracket is used for a fixed connection to the display screen.

In a specific implementable solution, the second driving piece further includes a second bracket fastened to the second intermittent gear, and the second bracket is configured to fixedly connect to a housing of the mobile terminal. The disposed second bracket is used to rotatably connect the second intermittent gear and the housing.

An oil storage groove is disposed in the position-limiting slot to improve an effect of fitting the shoulder with the position-limiting slot. In this way, a rolling effect of the convex shoulder is improved.

In a specific implementable solution, the intermittent lifting mechanism further includes a connection rod coaxially fastened to the second intermittent gear, where a bending structure used to press against the heat dissipation panel is disposed on the connection rod. The bending structure is used to push the heat dissipation panel to open and close.

In a specific implementation solution, a roller is sleeved on the bending structure. In this way, control of opening and closing is improved.

According to a second aspect, a mobile terminal is provided. The mobile terminal includes body and a display screen rotatably connected to the body, and further includes the intermittent lifting mechanism in any one of the first aspect or the implementable solutions of the first aspect. The first intermittent gear is fastened to the display screen; the body includes a housing and a heat dissipation panel rotatably connected to the housing; and the first intermittent gear and the second intermittent gear are rotatably connected to the housing, and the swing rod is slidably connected to the heat dissipation panel and is configured to push the heat dissipation panel to rotate.

In the foregoing solutions, the first driving piece and the second driving piece are used to drive the heat dissipation panel to rotate, so as to implement opening and closing, and the heat dissipation panel is locked in a required position. In this way, a structure of the driving mechanism is simplified, and occupied space or an occupied area is reduced.

In a specific process of disposing the intermittent lifting mechanism, there are two intermittent lifting mechanisms, and the two intermittent lifting mechanisms are symmetrically disposed. In this way, opening or closing of the heat dissipation panel are improved.

DETAILED DESCRIPTION OF THE EMBODIMENTS

To make the objectives, solutions, and advantages of the embodiments clearer, the following further describes the embodiments in detail with reference to the accompanying drawings.

Figure 1:
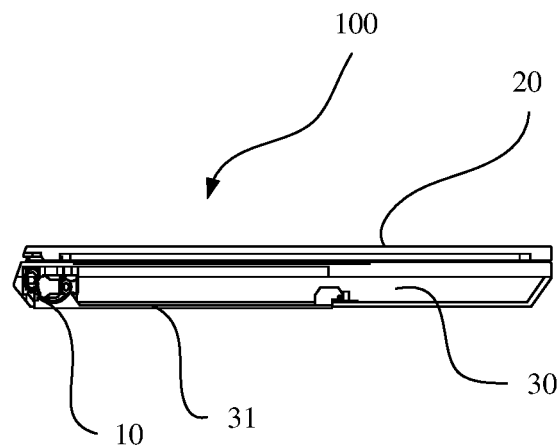
FIG. 1 is a schematic structural diagram of a mobile terminal according to an embodiment.
Figure 2:
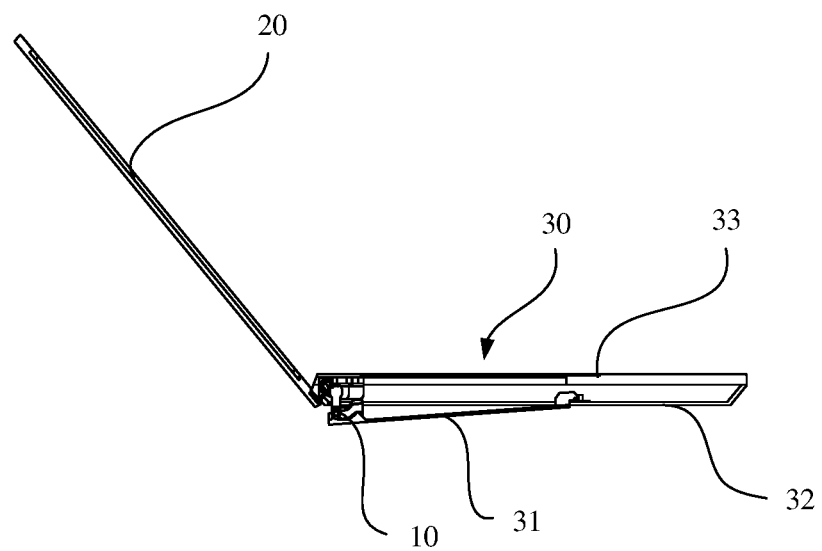
FIG. 2 is a reference diagram of a use status of a mobile terminal according to an embodiment.
Figure 3:
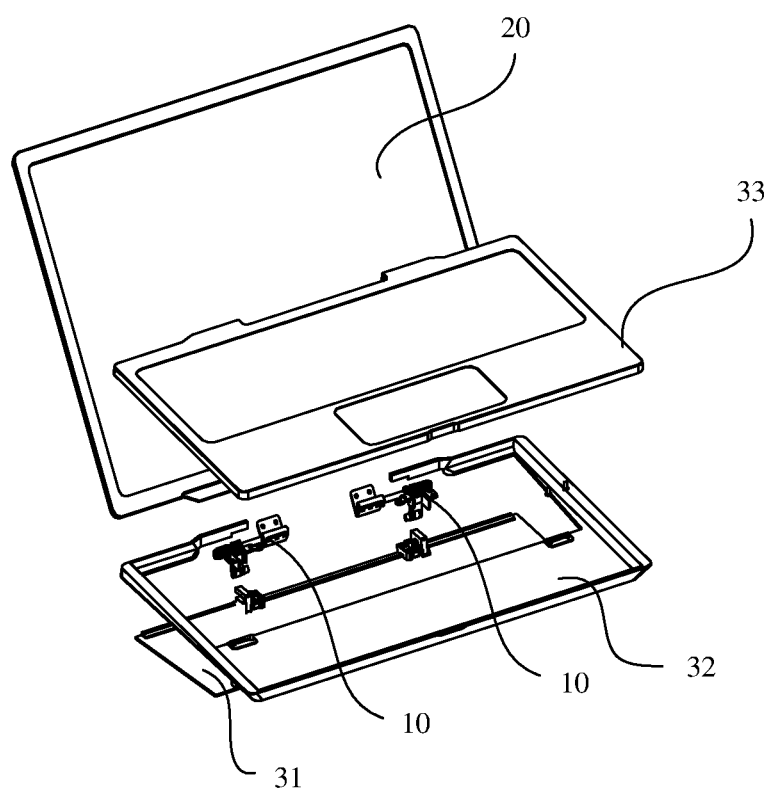
FIG. 3 is a schematic exploded view of a mobile terminal according to an embodiment.

An application scenario of an intermittent lifting assembly provided in the embodiments is first described to facilitate understanding of the intermittent lifting assembly. As shown in FIG. 1 and FIG. 2, the intermittent lifting assembly 10 provided in the embodiments is applied to a mobile terminal 100, for example, a notebook computer. The notebook computer includes a body and a display screen 20 rotatably connected to the body. The body is configured to accommodate structures such as a mainboard, a hard disk, and a processor. A connection relationship between the structures is the same as a connection relationship in the prior art, and details are not described herein. In addition, the body includes a housing 30, and the housing 30 includes a first housing 33 and a second housing 32 connected to the first housing 33. Space for accommodating the foregoing structures such as the mainboard, the hard disk, and the processor is enclosed with the first housing 33 and the second housing 32. As shown in FIG. 3, the second housing 32 is rotatably connected to a heat dissipation panel 31, and the heat dissipation panel 31 is configured to increase an intake air volume of the mobile terminal 100. During use, as shown in FIG. 1 and FIG. 2, first refer to FIG. 1. When the mobile terminal 100 is not used, the display screen 20 is closed; in this case, the heat dissipation panel 31 is closed. As shown in FIG. 2, when the mobile terminal 100 is used, the display screen 20 is opened, and the intermittent lifting assembly 10 is used to drive the heat dissipation panel 31 to rotated and opened. In this way, an intake air volume in the body is increased. In the foregoing movement process, there are two working processes for the intermittent lifting assembly 10: one is to drive, when the display screen 20 is rotated, the heat dissipation panel 31 to rotate and open; and the other is to enable the heat dissipation panel 31 to maintain in an opened state after the heat dissipation panel 31 is rotated and opened, and remove linkage between the heat dissipation panel 31 and the display screen 20.

Figure 4:
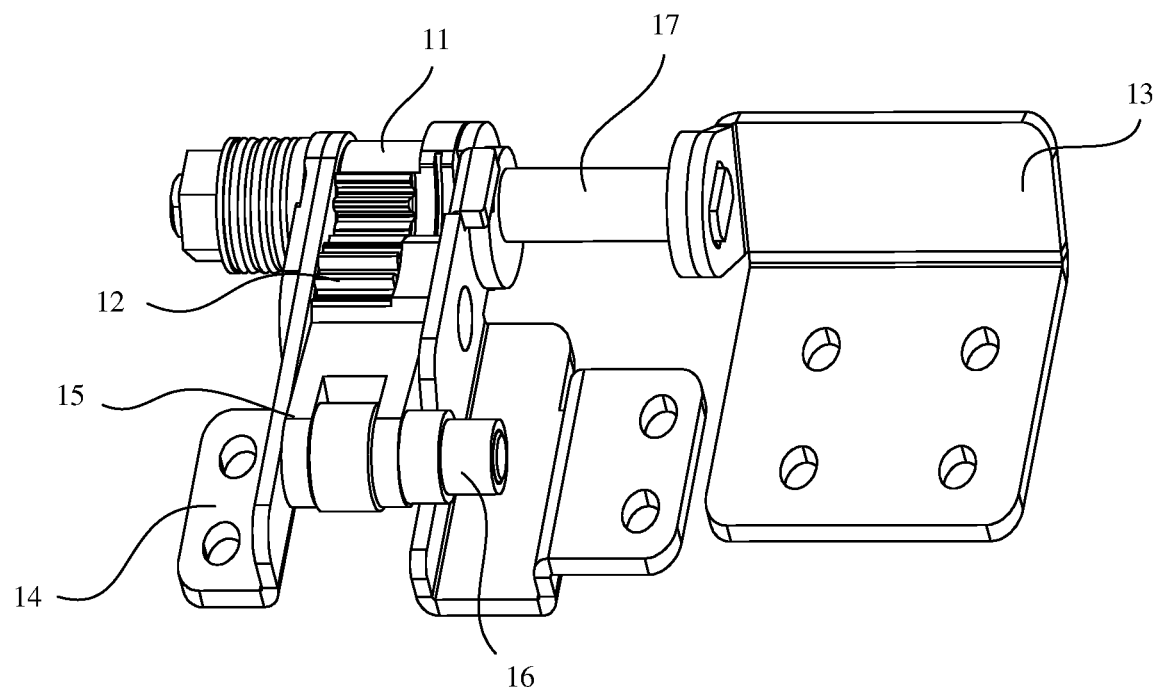
FIG. 4 is a schematic structural diagram of an intermittent lifting assembly according to an embodiment.

For ease of understanding the intermittent lifting assembly 10, first refer to FIG. 4. FIG. 4 shows a structure of the intermittent lifting assembly 10. The intermittent lifting assembly 10 includes three components: a first driving piece 11, a second driving piece 12, and a swing rod 15. The following describes a structure of the intermittent lifting assembly 10 with reference to FIG. 4, FIG. 5, and FIG. 6, to facilitate understanding of the intermittent lifting assembly 10 provided in the embodiments.

Figure 5:
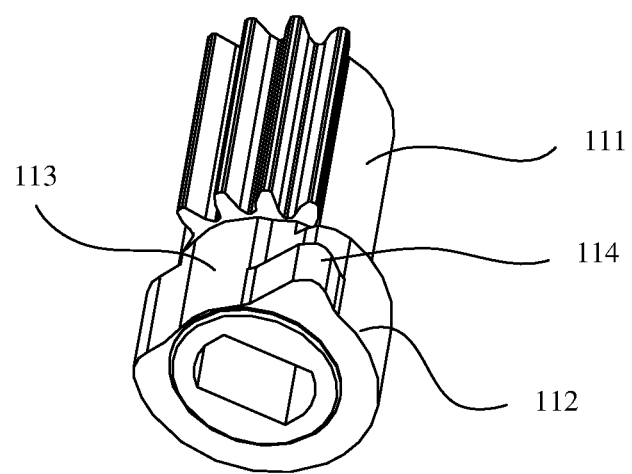
FIG. 5 is a schematic structural diagram of a first driving piece according to an embodiment.
Figure 6:
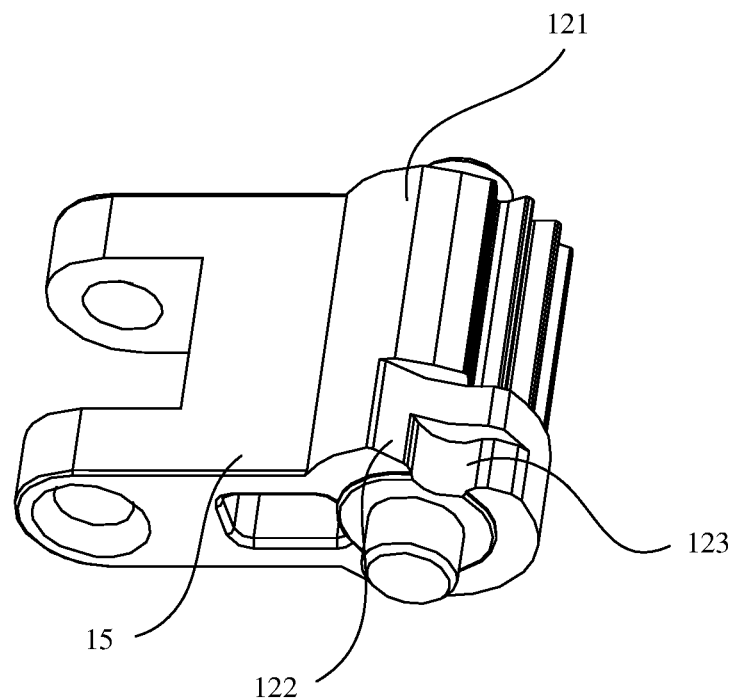
FIG. 6 is a schematic structural diagram of a second driving piece according to an embodiment.

FIG. 5 and FIG. 6 respectively show structures of the first driving piece 11 and the second driving piece 12. The first driving piece 11 and the second driving piece 12 each include an intermittent gear. For ease of description, an intermittent gear included in the first driving piece 11 is referred to as a first intermittent gear 111, and an intermittent gear included in the second driving piece 12 is referred to as a second intermittent gear 121. As shown in FIG. 4, when the first driving piece 11 fits with the second driving piece 12, teeth of the first intermittent gear and teeth of the second intermittent gear 121 are engaged with each other. During use, refer to both FIG. 3 and FIG. 4. The first driving piece 11 is fastened to the display screen 20. During connection, as shown in FIG. 4, the first intermittent gear 111 is sleeved on a rotating shaft 17, and may rotate synchronously with the rotating shaft 17. In addition, the other end of the rotating shaft 17 is fastened to a first bracket 13, and the first bracket 13 is fastened to the display screen 20. Therefore, when the display screen 20 rotates relative to the housing 30, a connection plate may drive, through the rotating shaft 17, the first intermittent gear 111 to rotate synchronously. In a process of disposing the second driving piece 12, the second driving piece 12 is fastened to the first housing 33, and the second intermittent gear 121 included in the second driving piece 12 may rotate relative to the housing 30. As shown in FIG. 3 and FIG. 4, the second driving piece 12 includes a second bracket 14. The second intermittent gear 121 is rotatably connected to the second bracket 14. When fitted with the mobile terminal 100, the second bracket 14 is fastened to the housing 30. In addition, the swing rod 15 of the intermittent lifting assembly 10 is fastened to the second intermittent gear 121, and may rotate synchronously with the second intermittent gear 121. The swing rod 15 is slidably connected to the heat dissipation panel 31 during assembly; and when the second intermittent gear 121 is rotated, the swing rod 15 is driven to rotate. In this case, the heat dissipation panel 31 is driven, by sliding the swing rod 15 and the heat dissipation panel 31, to rotate relative to the housing 30.

Figure 7:
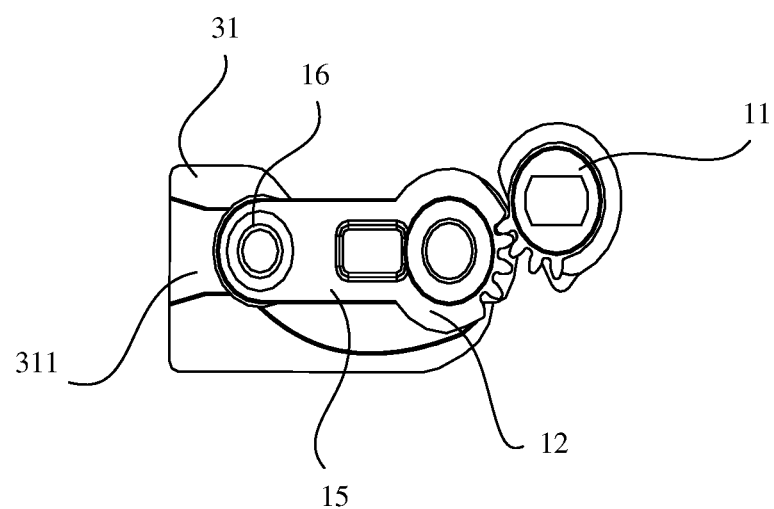
FIG. 7 is a schematic diagram of fitting a first driving piece with a second driving piece when a mobile terminal is closed according to an embodiment.
Figure 8:
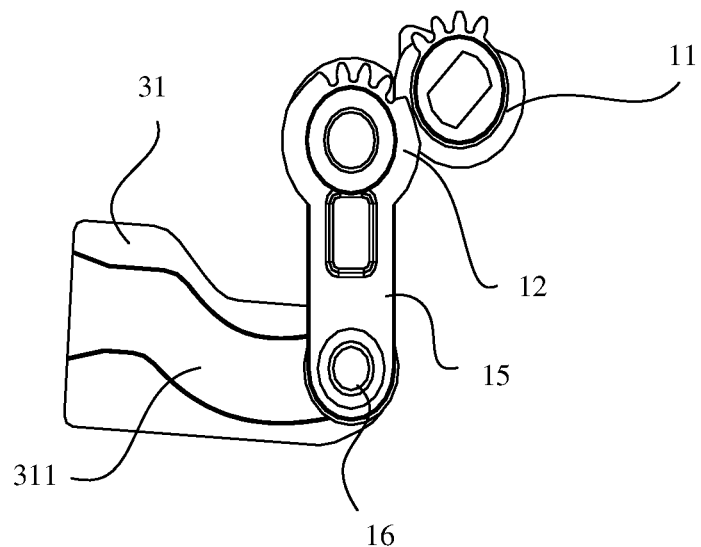
FIG. 8 is a schematic diagram of fitting a first driving piece with a second driving piece when a mobile terminal is opened according to an embodiment.

Fitting of two intermittent gears is first described to facilitate use of the intermittent lifting assembly 10. Referring to FIG. 5 and FIG. 6, teeth of the first intermittent gear 111 and teeth of the second intermittent gear 121 are disposed in different manners. The teeth of the first intermittent gear 111 are convexly formed teeth, and the teeth of the second intermittent gear 121 are concavely formed teeth. When the convexly formed teeth and the concavely formed teeth are formed, the first intermittent gear 111 includes a first cylinder, and the teeth of the first intermittent gear 111 protrude outside the first cylinder. As shown in FIG. 6, the second intermittent gear 121 includes a second cylinder, and the teeth of the second intermittent gear 121 are teeth formed by disposing grooves on the second cylinder. The first driving piece 11 and the second driving piece 12 are respectively configured to fixedly connect to the housing 30 and the display screen 20, and the second intermittent gear 121 in the second driving piece 12 may rotate relative to the housing 30. When the display screen 20 is opened and closed, the display screen 20 may drive the first driving piece 11 to rotate, and the first driving piece 11 drives the second driving piece 12 to rotate. During implementation, refer to both FIG. 7 and FIG. 8. FIG. 7 and FIG. 8 show states presented when the teeth of the first intermittent gear 111 and the teeth of the second intermittent gear 121 are fit. As shown in FIG. 7, the teeth of the first intermittent gear 111 and the teeth of the second intermittent gear 121 are engaged. In this case, the teeth are engaged so that the first intermittent gear 111 and the second intermittent gear 121 may rotate relative to each other. As shown in FIG. 8, when the first intermittent gear 111 and the second intermittent gear 121 are rotated to a specific position, the teeth of the first intermittent gear 111 and the teeth of the second intermittent gear 121 are out of an engaged state. In this case, the first cylinder is in contact with the second cylinder, or there is a specific spacing between the first cylinder and the second cylinder.

In a specific process of disposing the teeth of the first intermittent gear 111 and the teeth of the second intermittent gear 121, different quantities of teeth of each intermittent gear may be disposed, but there is a specific fitting relationship between the teeth of the intermittent gears. For example, when being disposed, N full-depth teeth are disposed on the first intermittent gear 111, and (N-1) full-depth teeth are correspondingly disposed on the second intermittent gear 121, where N is a positive integer greater than 2. The structures shown in FIG. 5 and FIG. 6 are used as examples. Four full-depth teeth are disposed on the first intermittent gear 111, and three full-depth teeth and two non-full-depth teeth are disposed on the second intermittent gear 121. It may be appreciated, however, that FIG. 5 shows only a specific actual case. A quantity of teeth of the first intermittent gear 111 may be three, five, six, or another positive integer. Two, four, five, or another different quantity of full-depth teeth may also be disposed on the second intermittent gear 121 correspondingly. It should be understood that the foregoing relationship between the quantity of teeth of the first intermittent gear 111 and the quantity of teeth of the second intermittent gear 121 is not limited to the foregoing limitation. Alternatively, a difference between the quantity of teeth of the first intermittent gear 111 and the quantity of teeth of the second intermittent gear 121 may be, for example, 3 or 4.

It can be understood from FIG. 7 and FIG. 8 that, when the first driving piece 11 and the second driving piece 12 are rotated to a specific position, the teeth of the first intermittent gear 111 and the teeth of the second intermittent gear 121 are out of an engaged state, for example, a state shown in FIG. 8. A fitting structure is disposed between the first driving piece 11 and the second driving piece 12 in the solution provided in the embodiments, to remove linkage between the heat dissipation panel 31 and the display screen 20, and keep the heat dissipation panel 31 in a relatively opened position. The fitting structure includes two structures: a convex shoulder 112 and a position-limiting slot 122. The convex shoulder 112 is disposed at an end of the first intermittent gear 111 and is disposed coaxially with the first intermittent gear 111. When being disposed, the convex shoulder 112 and the first cylinder may be integrated or separate. In this case, the convex shoulder 112 is sleeved and fastened on the first cylinder. Still referring to FIG. 5, the convex shoulder 112 is cylindrical, and a gap 113 is disposed on the convex shoulder 112. The gap 113 is used to avoid the second intermittent gear 121. In a process of disposing the gap 113, as shown in FIG. 5, a position in which the gap 113 is disposed corresponds to a position of the teeth of the first intermittent gear 111. When the position in which the gap 113 is disposed corresponds to the position of the teeth of the first intermittent gear 111, a first plane is introduced for ease of description. The first plane is a plane, away from the first intermittent gear 111, of the convex shoulder 112. A vertical projection of the teeth of the first intermittent gear 111 onto the first plane falls within a vertical projection of the gap 113 onto the first plane. In this case, when the teeth of the first intermittent gear and the teeth of the second intermittent gear 121 are engaged with each other, the disposed convex shoulder 112 does not affect engagement of the teeth, as shown in FIG. 7. FIG. 7 shows a relative position between the gap 113 and the teeth of the two intermittent gears in an engaged state. It can be understood from FIG. 7 that, when the teeth of the two intermittent gears are engaged with each other, the position of the gap 113 is moved to a position opposite to that of the teeth of the second intermittent gear 121, so as to avoid that the disposed convex shoulder 112 is in contact with the second intermittent gear 121.

Referring to FIG. 8, in the structure shown in FIG. 8, the teeth of the first intermittent gear 111 and the teeth of the second intermittent gear 121 are out of an engaged state. In this case, the gap 113 on the convex shoulder 112 is turned round a position-limiting slot, and the convex shoulder 112 starts to face the second intermittent gear 121. A position-limiting slot 122 is disposed on the second intermittent gear 121, to avoid interference between the convex shoulder 112 and the second intermittent gear 121 and limit a position in which the convex shoulder 112 rolls when the teeth of the first intermittent gear 111 and the teeth of the second intermittent gear 121 are out of an engaged state. The position-limiting slot 122 may limit rolling of the first driving piece 11. In a specific process of disposing the position-limiting slot 122, in the structure shown in FIG. 6, the position-limiting slot 122 is disposed at an end of the second cylinder, and the position-limiting slot 122 is an arc-shaped position-limiting slot 122. In the process, an arc-shaped gap 113 is disposed at an end of the second cylinder to form the position-limiting slot 122, and a center of the arc-shaped position-limiting slot 122 and a center of the convex shoulder 112 are a same center. During assembly, a position of the position-limiting slot 122 is opposite to that of the convex shoulder 112. Referring to FIG. 7 and FIG. 8, when the teeth of the first intermittent gear 111 and the teeth of the second intermittent gear 121 are engaged with each other, the gap 113 of the convex shoulder 112 is opposite to the second intermittent gear 121. When the first intermittent gear 111 continues to rotate, as shown in FIG. 8, the teeth of the first intermittent gear 111 are out of contact with the teeth of the second intermittent gear 121. In this case, the convex shoulder 112 is rotated to the position-limiting slot 122, and may roll in the position-limiting slot 122. In addition, to reduce friction during rolling, an oil storage groove is disposed in the position-limiting slot 122 during disposing, to improve a rolling effect of the convex shoulder 112. When the display screen 20 is rotated, the first driving piece 11 is driven to rotate in the position-limiting slot 122. In addition, because the position-limiting slot 122 fits with the convex shoulder 112, rotation of the second intermittent gear 121 is limited, so that the second intermittent gear 121 remains in a position in which the rotation occurs. The position of the second intermittent gear 121 is relative to the heat dissipation panel 31. Therefore, when the second intermittent gear 121 remains unrotated, a status of the heat dissipation panel 31 does not change.

It should be understood that the foregoing out of engaged state is a state that is before the first intermittent gear 111 and the second intermittent gear 121 are engaged, and a state that is after the first intermittent gear 111 and the second intermittent gear 121 are engaged. A quantity of position-limiting slots 122 may be set based on an actual requirement. One position-limiting slot 122 may be disposed, or two position-limiting slots 122 may be disposed. FIG. 6 shows a position of the position-limiting slot 122 that is after the first intermittent gear 111 is detached from the second intermittent gear 121. When two position-limiting slots 122 are used, the position-limiting slots 122 are respectively disposed in corresponding positions that are before and after the first intermittent gear 111 and the second intermittent gear 121 are engaged.

Figure 9A:
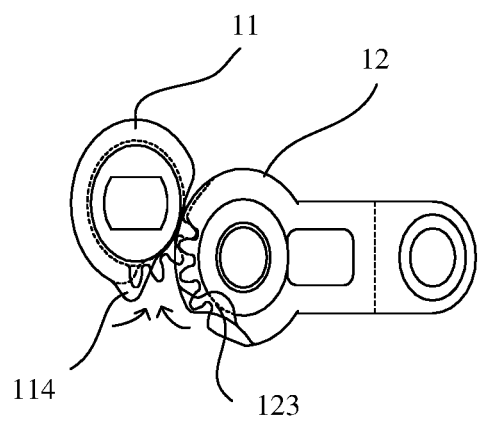
FIG. 9a is a schematic diagram of fitting a first driving piece with a second driving piece according to an embodiment.
Figure 9B:
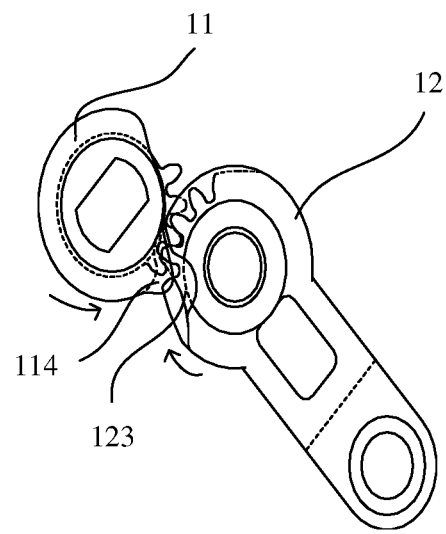
FIG. 9b is a schematic diagram of fitting a first driving piece with a second driving piece according to an embodiment.
Figure 9C:
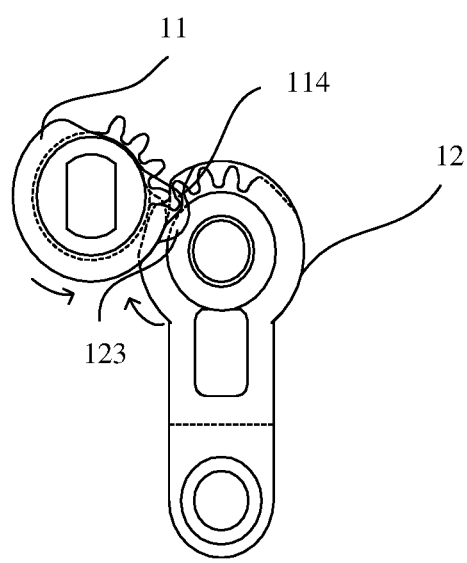
FIG. 9c is a schematic diagram of fitting a first driving piece with a second driving piece according to an embodiment.
Figure 9D:
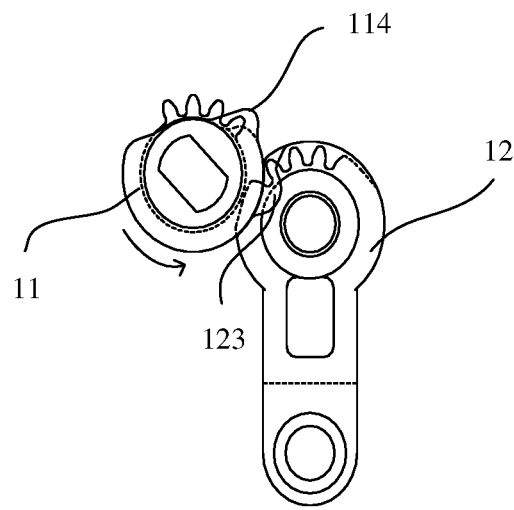
FIG. 9d is a schematic diagram of fitting a first driving piece with a second driving piece according to an embodiment.
Figure 9E:
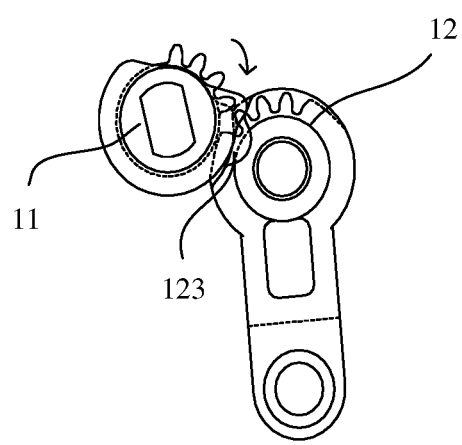
FIG. 9e is a schematic diagram of fitting a first driving piece with a second driving piece according to an embodiment.
Figure 9F:
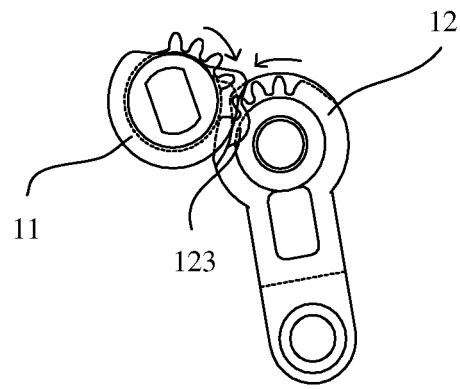
FIG. 9f is a schematic diagram of fitting a first driving piece with a second driving piece according to an embodiment.

To facilitate understanding of an effect of fitting the first intermittent gear 111 with the second intermittent gear 121, the following describes rotation statuses of the first intermittent gear 111 and the second intermittent gear 121 with reference to FIG. 9a to FIG. 9f. First, referring to FIG. 9a, an arrow shown in FIG. 9a is used as an example. The first intermittent gear 111 rotates counterclockwise, and the second intermittent gear 121 is simultaneously driven to rotate clockwise. In addition, the swing rod 15 is in a horizontal position. The first intermittent gear 111 shown in FIG. 9a starts to be engaged with the first tooth of the second intermittent gear 121. When the display screen 20 continues to be rotated, as shown in FIG. 9b, when the first intermittent gear 111 is rotated to a specific angle, the second intermittent gear 121 is also rotated clockwise to a specific angle, and simultaneously drives the swing rod 15 to rotate to a corresponding angle. Referring to FIG. 2, when the swing rod 15 is rotated, the heat dissipation panel 31 is driven to rotate, so that the heat dissipation panel 31 is opened. Still referring to FIG. 9c, when the first intermittent gear 111 continues to be rotated, teeth of the first intermittent gear 111 and teeth of the second intermittent gear 121 are out of an engaged state. In this case, the convex shoulder 112 of the first driving piece 11 just is rotated to the position-limiting slot 122 of the second driving piece 12. After the first intermittent gear 111 and the second intermittent gear 121 are out of an engaged state, the convex shoulder 112 starts to fit the position-limiting slot 122. Still referring to FIG. 9d, when the first intermittent gear 111 continues to be rotated, the convex shoulder 112 rolls in the position-limiting slot 122 of the second driving piece 12, a position of the second intermittent gear 121 keeps consistent with the position shown in FIG. 9c, and a position of the swing rod 15 also remains unchanged. Corresponding to the structure in FIG. 2, when the display screen 20 is rotated and opened to a specific position, because the position of the swing rod 15 is unchanged, the heat dissipation panel 31 remains opened. Still referring to FIG. 9f, FIG. 9f shows a status of fitting the first intermittent gear 111 with the second intermittent gear 121 when the mobile terminal 100 is closed. In this case, the first intermittent gear 111 starts to be rotated clockwise. In addition, when the first intermittent gear 111 is engaged with the second intermittent gear 121, the first intermittent gear 111 drives the second intermittent gear 121 to rotate; in this case, the second intermittent gear 121 starts to be rotated counterclockwise. Corresponding to the structure in FIG. 2, the display screen 20 is rotated toward the housing 30, to close the entire mobile terminal 100. In a closing process, the first intermittent gear 111 drives the second intermittent gear 121 to rotate, and the swing rod 15 also is rotated with the second intermittent gear 121. When the swing rod 15 is rotated, the heat dissipation panel 31 is driven to close, so as to close the air intake vent. It can be understood from the foregoing description that linkage between the heat dissipation panel 31 and the display screen 20 can be improved by fitting the first intermittent gear 111 with the second intermittent gear 121. For example, the first intermittent gear 111 is rotated by 0 degrees to 150 degrees in an entire process. When the first intermittent gear 111 is rotated to 0 degrees to 30 degrees, the second intermittent gear 121 is not rotated with the first intermittent gear 111 (the first intermittent gear 111 is not engaged with the second intermittent gear 121 yet). The second intermittent gear 121 is rotated with the first intermittent gear 111 when the first intermittent gear 111 is rotated to 30 degrees to 60 degrees (the first intermittent gear 111 is engaged with the second intermittent gear 121). When the first intermittent gear 111 is rotated to 60 to 150 degrees, the second intermittent gear 121 is not rotated with the first intermittent gear 111 (the first intermittent gear 111 and the second intermittent gear 121 are out of an engaged state, but the swing rod 15 is in a state of pushing the heat dissipation panel 31 to open). In this case, linkage with rotation of the display screen 20 can be removed, and the heat dissipation panel 31 is not always rotated with the display screen 20. In this way, a use effect of the mobile terminal 100 is improved. It should be understood that the rotation angle of the first intermittent gear 111 is merely an example, and an angle by which the first intermittent gear 111 is rotated relative to the second intermittent gear may be adjusted as required. When being disposed, the disposed teeth need to be adjusted based on an actual requirement.

In a specific process of disposing the second intermittent gear 121, the second intermittent gear 121 may have different structures, for example, an integrated structure and a separate structure. First, still referring to FIG. 6, in the structure disposed in FIG. 6, the second intermittent gear 121 is of an integrated structure. In this case, the second intermittent gear 121 includes the foregoing second cylinder, and teeth are disposed on the second cylinder. In addition, a shaft is disposed at two ends of the second cylinder, and the shaft is configured to rotatably connect to the second bracket 14. In a process of disposing the swing rod 15, as shown in FIG. 6, the swing rod 15 and the second intermittent gear 121 are of an integrated structure. In the structure shown in FIG. 6, there are two swing rods 15, and the swing rods 15 are arranged on two sides of the second intermittent gear 121. When being disposed, the two swing rods 15 are slidably connected to the heat dissipation panel 31 through a rolling wheel 16. In a specific process of disposing the rolling wheel 16, the rolling wheel 16 is disposed at an end, away from the second intermittent gear 121, of the swing rod 15. In addition, during slidable connection, a slide track 311 correspondingly fitted with the swing rod 15 is disposed on the heat dissipation panel 31. The slide track 311 is a curved slide track, and the curved slide track is used to adjust a rising or drop speed of the mobile terminal when the display screen 20 is opened. In this case, when the display screen 20 is closed at a constant speed, the mobile terminal rises and drops at a constant speed. A specific sliding-based assembly of the slide track 311 and the rolling wheel 16 is a common technical means in the prior art, and details are not described herein.

Figure 10:
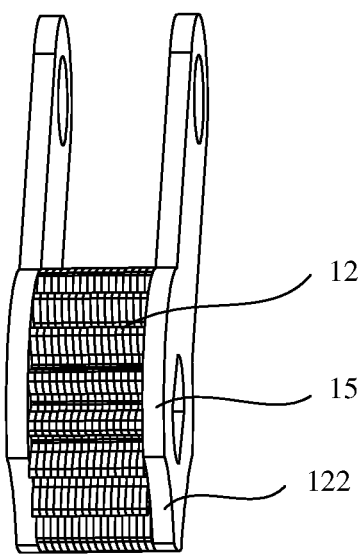
FIG. 10 is another schematic structural diagram of a second intermittent gear according to an embodiment.
Figure 11:
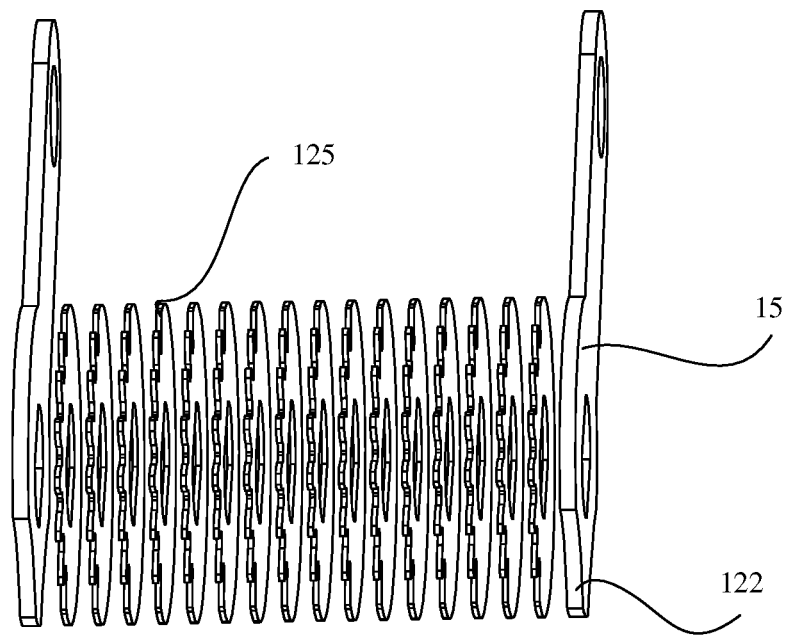
FIG. 11 is a schematic exploded diagram of a second intermittent gear according to an embodiment.

In addition to the foregoing integrated structure, the second intermittent gear 121 may alternatively be of a separate structure. For details, refer to FIG. 10 and FIG. 11. FIG. 10 is a schematic structural diagram of the second intermittent gear 121. FIG. 11 is a schematic exploded view of the second intermittent gear 121. In this case, the second intermittent gear 121 includes a plurality of sheet metal tabs 125, and the plurality of sheet metal tabs 125 are stacked and arranged in a columnar structure. A rotating shaft (not shown in the figure) penetrates through the sheet metal tabs 125. In addition, teeth are disposed on each sheet metal tab 125. When the plurality of sheet metal tabs 125 are stacked and the rotating shaft penetrates through the sheet metal tabs 125, the teeth of the plurality of sheet metal tabs 125 correspond to each other, and form the second intermittent gear 121. In addition, there are two swing rods 15, and the swing rods 15 are sleeved on the rotating shaft and are located at ends of the second intermittent gear 121. It can be understood from the foregoing description that, in a specific process of disposing the second intermittent gear 121, the second intermittent gear 121 may be formed through assembly with the sheet metal tabs. In addition, during assembly, the swing rod 15 may alternatively be an assembled part. During assembly of the second intermittent gear 121, the swing rod 15 is assembled together with the sheet mental tabs. During assembly, a limiting structure used to limit the sheet mental tabs and the swing rods 15 in an axial direction is disposed on the rotating shaft. Different structures such as a jump ring and a convex shoulder on the shaft may be used as the limiting structure, provided that only movement of the sheet mental tabs and the swing rod 15 can be limited. In addition, the limiting structure is a common structure in the prior art. Therefore, details are not described herein.

Figure 12:
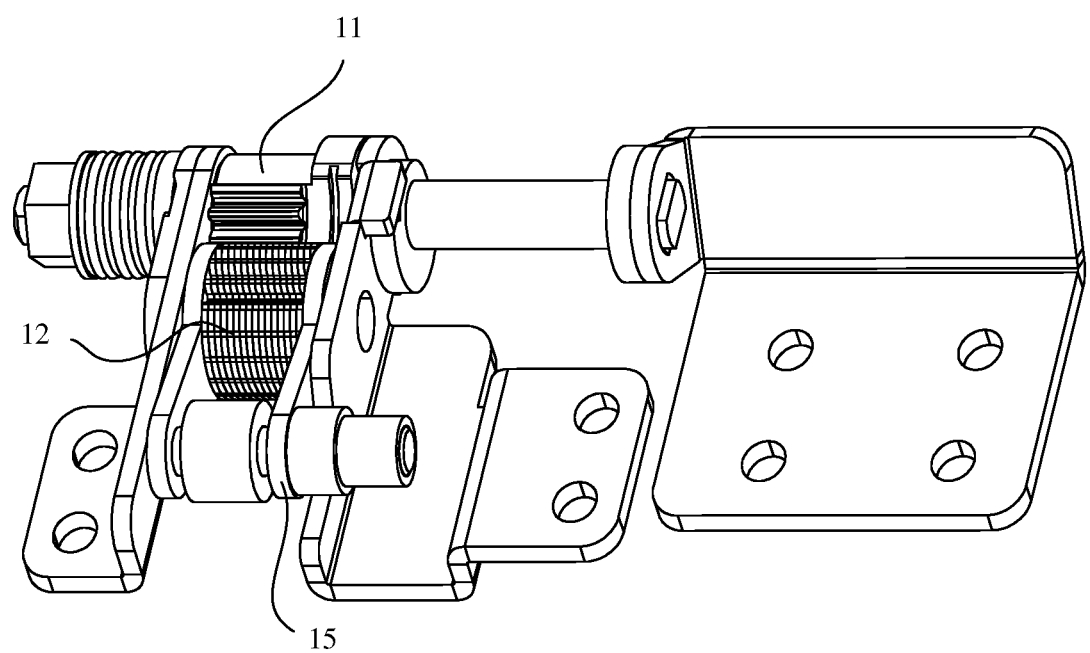
FIG. 12 is a schematic structural diagram of another intermittent lifting assembly according to an embodiment.

Referring to FIG. 12, FIG. 12 shows a structure of an intermittent lifting assembly 10 used when the second driving piece 12 is of a separate structure. During assembly, the second intermittent gear 121 is rotatably connected to the second bracket 14 through the rotating shaft. In addition, a rotating shaft is disposed on the swing rod 15, and a rolling wheel 16 is disposed on the rotating shaft, to slidably connect to the heat dissipation panel 31. In addition, the disposed rolling wheel 16 can further reduce friction force generated during sliding.

Figure 13:
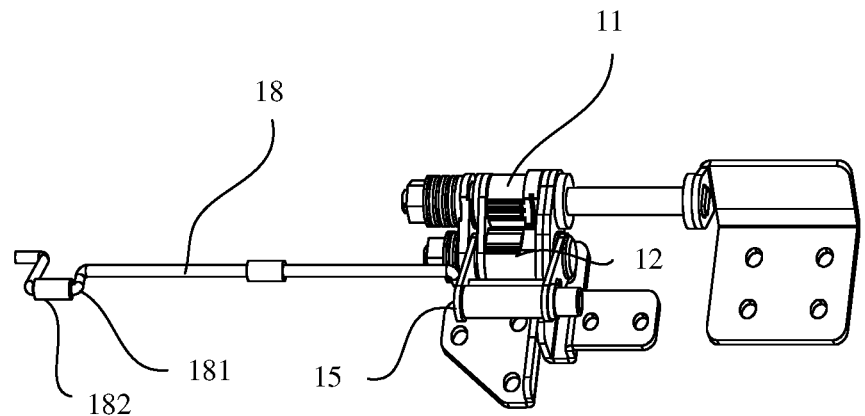
FIG. 13 is a schematic structural diagram of another intermittent lifting assembly according to an embodiment.

Still referring to FIG. 2, it can be understood from FIG. 2 that the heat dissipation panel 31 is of an elongated structure. However, when the swing rod 15 provided in this embodiment fits with the heat dissipation panel 31, only one end of the heat dissipation panel 31 can be pushed. To improve an effect of pushing the heat dissipation panel 31, in a specific process of disposing the swing rod 15, as shown in FIG. 13, a connection rod 18 is coaxially fastened on the second intermittent gear 121, and a bending structure 181 used to press against the heat dissipation panel 31 is disposed on the connection rod. Still referring to FIG. 13, when the connection rod 18 is disposed, a length direction of the connection rod 18 is the same as a length direction of a rotating shaft that is when the second intermittent gear 121 is rotatably connected to the second bracket 14. For example, the length direction of the connection rod 18 is along a length direction of the heat dissipation panel 31 (where the length direction of the heat dissipation panel 31 is a length direction of an axis wound when the heat dissipation panel 31 is rotatably connected to the housing 30). In addition, a roller 182 is sleeved on the bending structure 181, and when the roller 182 is assembled with the heat dissipation panel 31, a sliding-based assembly manner is also used, so that the rolling wheel 16 and the roller 182 can respectively push two ends of the heat dissipation panel 31 to rotate.

Still referring to FIG. 5 and FIG. 6, when the first intermittent gear 111 fits with the second intermittent gear 121, tooth alignment needs to be performed. In a process of disposing the convex shoulder 112, an alignment protrusion 114 is disposed on the convex shoulder 112, and correspondingly an alignment groove 123 fitted with the alignment protrusion 114 is disposed on the second intermittent gear 121, to ensure that the teeth of the first intermittent gear 111 and the teeth of the second intermittent gear 121 can be accurately aligned. When the alignment protrusion 114 fits with the alignment groove 123, the teeth of the first intermittent gear 111 and the teeth of the second intermittent gear 121 implement engagement. For example, refer to FIG. 9a to FIG. 9f. First, as shown in FIG. 9a, when the first intermittent gear 111 and the second intermittent gear 121 are engaged and rotated, the alignment protrusion 114 is located outside the alignment groove 123, and the alignment protrusion 114 is rotated opposite to the alignment groove 123. As shown in FIG. 9b, with relative rotation between the first intermittent gear 111 and the second intermittent gear 121, the alignment protrusion 114 gradually enters the alignment groove 123. As shown in FIG. 9c, after the first intermittent gear 111 is out of contact with the second intermittent gear 121, the alignment protrusion 114 and the alignment groove 123 start to be out of contact. As shown in FIG. 9d, when the first intermittent gear 111 continues to be rotated, the alignment protrusion 114 slides out of the alignment groove 123. As shown in FIG. 9f, when the first intermittent gear 111 and the second intermittent gear 121 are reversely rotated, the alignment protrusion 114 first enters the alignment groove 123. The alignment protrusion 114 is aligned with the alignment groove 123, so that the teeth of the first intermittent gear 111 and the teeth of the second intermittent gear 121 can be aligned and engaged. In this way, when the first intermittent gear 111 and the second intermittent gear 121 are engaged again after being out of the engaged state, accurate engagement between the first intermittent gear 111 and the second intermittent gear 121 can be ensured; and an effect of engaging the first intermittent gear 111 and the second intermittent gear 121 is improved. In addition, the alignment protrusion 114 and the alignment groove 123 can further adjust the first intermittent gear 111 and the second intermittent gear 121. When the first intermittent gear 111 and the second intermittent gear 121 deviate from each other, the first intermittent gear 111 is reset by fitting the alignment protrusion 114 with the alignment groove 123. In this way, the gears can be accurately engaged.

It can be understood from the foregoing embodiments that, according to the intermittent lifting assembly in the embodiments, a cavity used for heat dissipation in the housing is opened or closed by driving the heat dissipation panel 31 to open or close. In the foregoing embodiments, description is provided using an example in which the heat dissipation panel 31 is disposed on the mobile terminal. However, the intermittent lifting assembly provided in the embodiments is not limited to being applied to the foregoing mobile terminal. When another manner is used for the mobile terminal, the intermittent lifting assembly provided in the embodiments may alternatively be used. For example, the housing of the mobile terminal includes only a first housing and a second housing, and space for accommodating components such as a mainboard and a hard disk is enclosed with the first housing and the second housing. In addition, the first housing is rotatably connected to the second housing, and a display screen is rotatably connected to the first housing. In this case, a first driving piece of the intermittent lifting assembly is fastened to the display screen, and a push rod connected to a second driving piece is slidably connected to the second housing. In this case, the second housing is used as a heat dissipation panel. Alternatively, a display screen is rotatably connected to the second housing. In this case, a first driving piece of the intermittent lifting assembly is fastened to a display screen, and a push rod connected to the second driving piece is slidably connected to the first housing. In this case, the first housing is used as a heat dissipation panel. When the foregoing structure is used, for a fitting relationship between the first driving piece and the display screen and between the second driving piece and the first housing or the second housing, refer to a connection between the first driving piece and the display screen, and a connection between the second driving piece and the heat dissipation panel in the foregoing embodiments. When the foregoing structure is used, the intermittent lifting assembly can also implement intermittent movement, to control opening and closing of the heat dissipation cavity.

Figure 14:
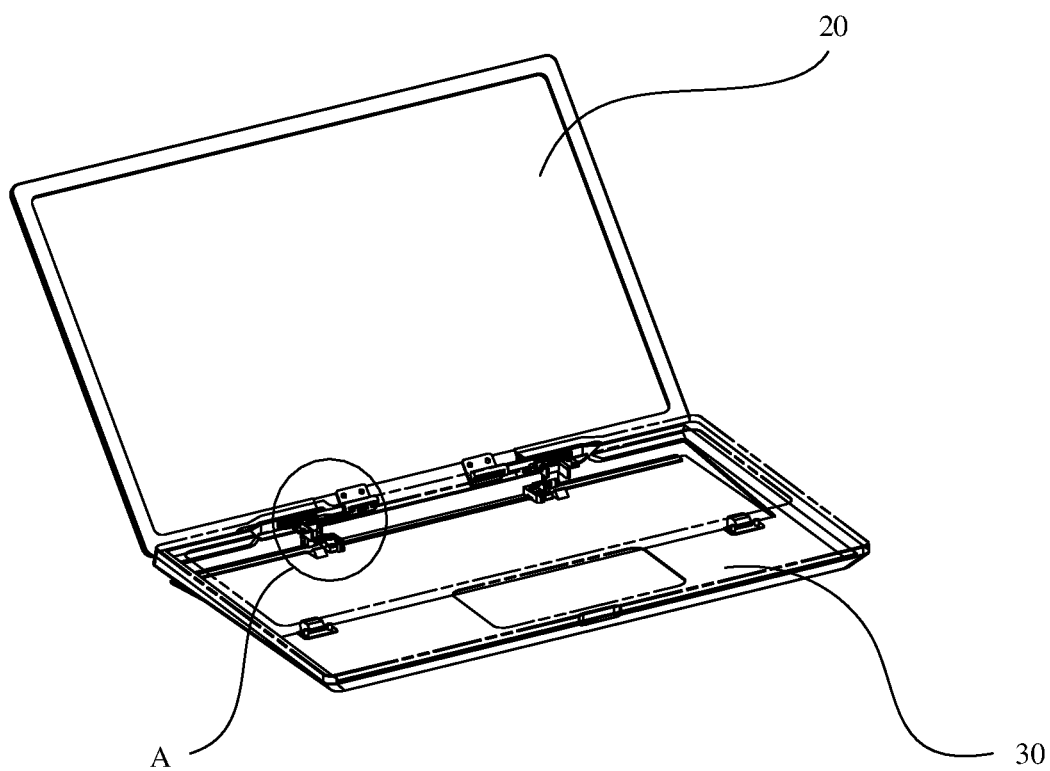
FIG. 14 is a schematic structural diagram of a mobile terminal according to an embodiment.
Figure 15:
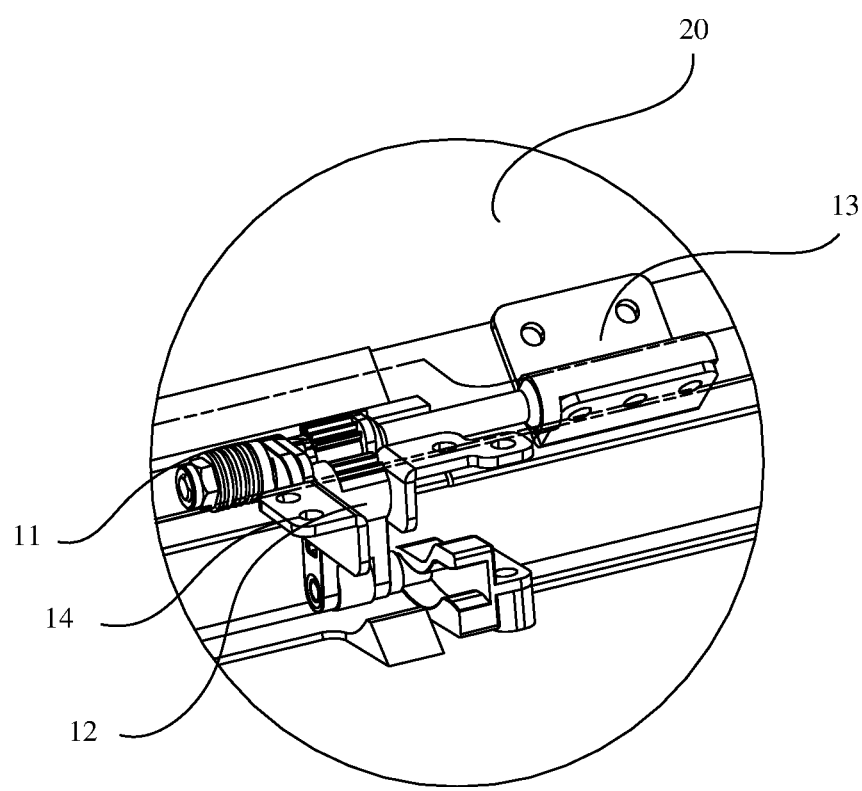
FIG. 15 is a partial enlarged view of A in FIG. 14.

In addition, as shown in FIG. 14, an embodiment further provides a mobile terminal 100. The mobile terminal 100 may be a notebook computer. When being specifically disposed, the notebook computer includes a body and a display screen 20 rotatably connected to the body. The body is configured to accommodate structures such as a mainboard, a hard disk, and a processor. A connection relationship between the structures is the same as a connection relationship in the prior art, and details are not described herein. In addition, the body includes a housing 30. The housing 30 includes a first housing 33 and a second housing 32 connected to the first housing 33. Space for accommodating the foregoing structures such as the mainboard, the hard disk, and the processor is enclosed with the first housing 33 and the second housing 32. As shown in FIG. 3, a heat dissipation panel 31 is rotatably connected to the second housing 32. The heat dissipation panel 31 is configured to increase an intake air volume of the mobile terminal 100. When the mobile terminal 100 is not used, the display screen 20 is closed; in this case, the heat dissipation panel 31 is closed. When the mobile terminal 100 is used, the display screen 20 is opened, and the intermittent lifting assembly 10 is used to drive the heat dissipation panel 31 to rotate and open, so as to increase an intake air volume in the body. In a specific process of disposing the intermittent lifting assembly 10, as shown in FIG. 15, the first intermittent gear 111 is fastened to the display screen 20. The first intermittent gear 111 and the second intermittent gear 121 are rotatably connected to the housing 30, and the swing rod 15 is slidably connected to the heat dissipation panel 31 and is configured to push the heat dissipation panel 31 to rotate. For a specific connection manner, refer to the foregoing description. In the foregoing movement process, there are two working processes for the intermittent lifting assembly 10: One is to drive, when the display screen 20 is rotated, the heat dissipation panel 31 to rotate and open; and the other is to enable the heat dissipation panel 31 to maintain in an opened state after the heat dissipation panel 31 is rotated and opened, and remove linkage between the heat dissipation panel 31 and the display screen 20. It can be understood from the foregoing description that the mobile terminal 100 provided in this embodiment drives, through the first driving piece 11 and the second driving piece 12, the heat dissipation panel 31 to rotate, so as to implement opening and closing; and locks the heat dissipation panel 31 in a required position. In this way, a structure of the driving mechanism is simplified, and occupied space or an occupied area is reduced.

In a specific process of disposing the intermittent lifting mechanism, there are two intermittent lifting mechanisms, and the two intermittent lifting mechanisms are symmetrically disposed, to improve an effect of pushing the heat dissipation panel. In this way, an opening or closing effect of the heat dissipation panel 31 is improved.

The foregoing descriptions are merely specific implementations of the embodiments, but are non-limiting. Any variation or replacement readily figured out by a person of ordinary skill in the art within the scope disclosed in the embodiments shall is envisioned by the embodiments.

What is claimed is:

1. An intermittent lifting assembly, configured to drive a heat dissipation panel of a mobile terminal to open and close, comprising:
    a first driving piece comprising a first intermittent gear and a convex shoulder disposed on the first intermittent gear;
    a second driving piece comprising a second intermittent gear engaged with the first intermittent gear, wherein a position-limiting slot is disposed on the second intermittent gear;
    the position-limiting slot is configured to limit a position in which the convex shoulder rolls when teeth of the first intermittent gear and teeth of the second intermittent gear are out of an engaged state, and a gap for avoiding the second intermittent gear is disposed on the convex shoulder; and
    a swing rod, fastened to the second intermittent gear, and configured to drive the heat dissipation panel to open or close.

2. The intermittent lifting assembly according to claim 1, wherein the first intermittent gear comprises N full-depth teeth, and the second intermittent gear comprises (N-1) full-depth teeth and two non-full-depth teeth located on two sides of the (N-1) full-depth teeth, wherein N is a positive integer greater than 2.

3. The intermittent lifting assembly according to claim 1, wherein the second intermittent gear comprises a rotating shaft and a plurality of sheet metal tabs through which the rotating shaft penetrates, and each sheet metal tab is provided with teeth; when the plurality of sheet metal tabs are stacked and penetrates through the rotating shaft, the plurality of sheet metal tabs form the second intermittent gear; and
    the swing rod is sleeved on the rotating shaft and is located at an end of the second intermittent gear, and the position-limiting slot is disposed on the swing rod.

4. The intermittent lifting assembly according to claim 1, wherein a rolling wheel that is in sliding fit with the heat dissipation panel is disposed at an end, away from the second intermittent gear, of the swing rod.

5. The intermittent lifting assembly according to claim 1, wherein an alignment protrusion is disposed on the convex shoulder, and an alignment groove fitted with the alignment protrusion is disposed on the second intermittent gear; and when the alignment protrusion fits with the alignment groove, the teeth of the first intermittent gear and the teeth of the second intermittent gear are aligned to an engaged state.

6. The intermittent lifting assembly according to claim 1, wherein the first driving piece further comprises a first bracket fastened to the first intermittent gear, and the first bracket is configured to fixedly connect to a display screen of the mobile terminal.

7. The intermittent lifting assembly according to claim 1, wherein the second driving piece further comprises a second bracket fastened to the second intermittent gear, and the second bracket is configured to fixedly connect to a housing of the mobile terminal.

8. The intermittent lifting assembly according to claim 1, wherein an oil storage groove is disposed in the position-limiting slot.

9. The intermittent lifting assembly according to claim 1, further comprising a connection rod coaxially fastened to the second intermittent gear, wherein a bending structure used to press against the heat dissipation panel is disposed on the connection rod.

10. The intermittent lifting assembly according to claim 9, wherein a roller is sleeved on the bending structure.

11. A mobile terminal, comprising a body and a display screen rotatably connected to the body, and further comprising an intermittent lifting assembly configured to drive a heat dissipation panel of a mobile terminal to open and close,
    the intermittent lifting assembly comprising:
        a first driving piece comprising a first intermittent gear and a convex shoulder disposed on the first intermittent gear;

a second driving piece comprising a second intermittent gear engaged with the first intermittent gear, wherein a position-limiting slot is disposed on the second intermittent gear;

the position-limiting slot is configured to limit a position in which the convex shoulder rolls when teeth of the first intermittent gear and teeth of the second intermittent gear are out of an engaged state, and a gap for avoiding the second intermittent gear is disposed on the convex shoulder; and a swing rod, fastened to the second intermittent gear and configured to drive the heat dissipation panel to open or close;

the first intermittent gear is fastened to the display screen; and the body comprises a housing and a heat dissipation panel rotatably connected to the housing; the first intermittent gear and the second intermittent gear are rotatably connected to the housing, and the swing rod is slidably connected to the heat dissipation panel and is configured to push the heat dissipation panel to rotate.

12. The mobile terminal according to claim 11, wherein there are two intermittent lifting mechanisms, and the two intermittent lifting mechanisms are symmetrically disposed.

13. The mobile terminal according to claim 11, wherein the second intermittent gear comprises a rotating shaft and a plurality of sheet metal tabs through which the rotating shaft penetrates, and each sheet metal tab is provided with teeth; when the plurality of sheet metal tabs are stacked and penetrates through the rotating shaft, the plurality of sheet metal tabs form the second intermittent gear; and the swing rod is sleeved on the rotating shaft and is located at an end of the second intermittent gear, and the position-limiting slot is disposed on the swing rod.

14. The mobile terminal according to claim 11, wherein a rolling wheel that is in sliding fit with the heat dissipation panel is disposed at an end, away from the second intermittent gear, of the swing rod.

15. The mobile terminal according to claim 11, wherein an alignment protrusion is disposed on the convex shoulder, and an alignment groove fitted with the alignment protrusion is disposed on the second intermittent gear; and when the alignment protrusion fits with the alignment groove, the teeth of the first intermittent gear and the teeth of the second intermittent gear are aligned to an engaged state.

16. The mobile terminal according to claim 11, wherein the first driving piece further comprises a first bracket fastened to the first intermittent gear, and the first bracket is configured to fixedly connect to a display screen of the mobile terminal.

17. The mobile terminal according to claim 11, wherein the second driving piece further comprises a second bracket fastened to the second intermittent gear, and the second bracket is configured to fixedly connect to a housing of the mobile terminal.

18. The mobile terminal according to claim 11, further comprising a connection rod coaxially fastened to the second intermittent gear, wherein a bending structure used to press against the heat dissipation panel is disposed on the connection rod.

19. The mobile terminal according to claim 18, wherein a roller is sleeved on the bending structure.

20. The mobile terminal according to claim 11, wherein there are two position-limiting slots, and the two position-limiting slots disposed at intervals are disposed on the second intermittent gear, and the two position-limiting slots are both configured to limit a position in which the convex shoulder rolls before and after the teeth of the first intermittent gear and the teeth of the second intermittent gear are engaged.

* * * * *